Sept. 22, 1964    B. W. LARSEN    3,149,939
CENTRIFUGAL SEPARATOR
Filed May 4, 1961    2 Sheets-Sheet 1
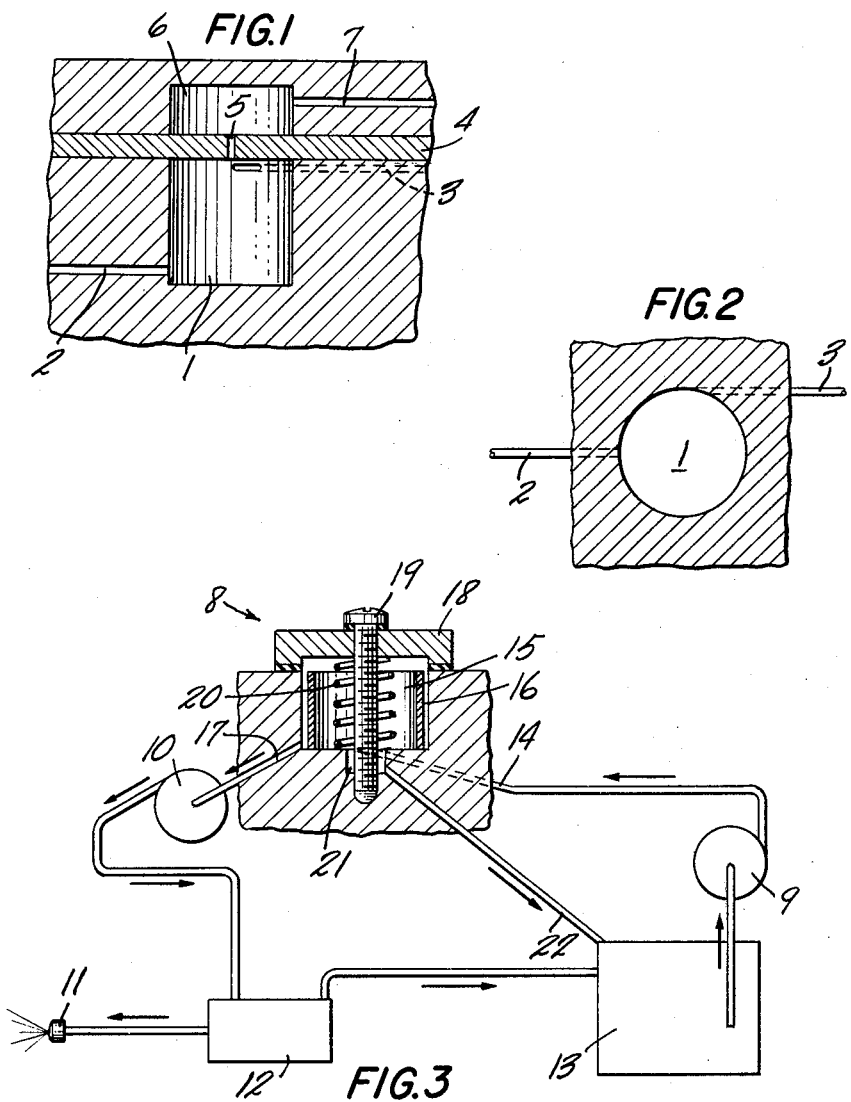

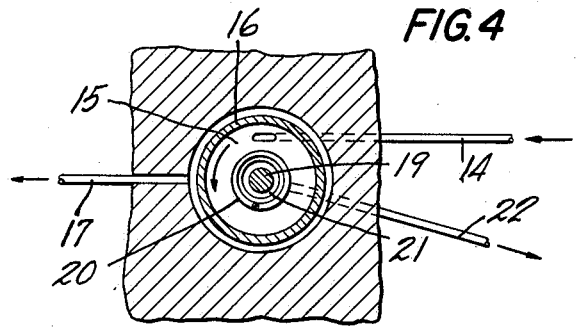
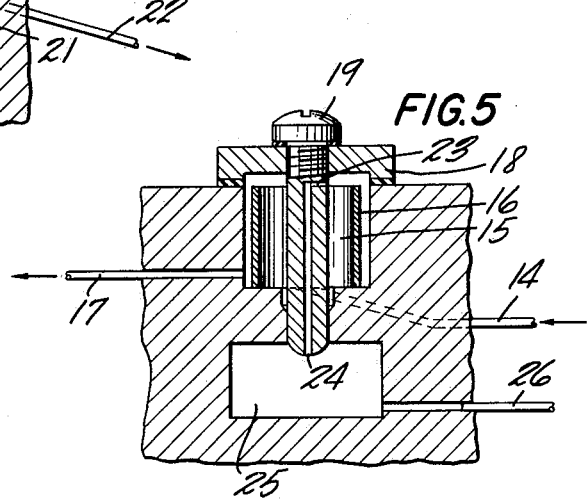
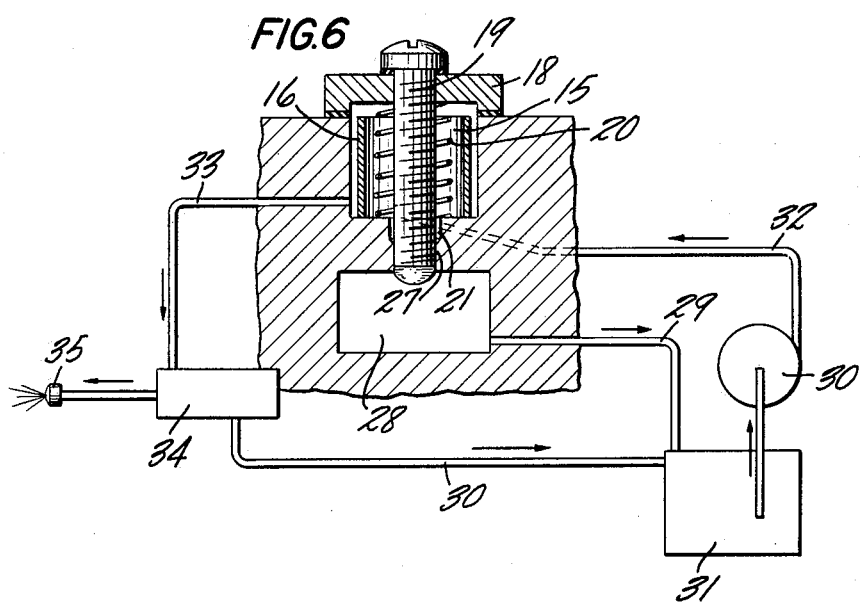

UNITED STATES PATENT OFFICE 3,149,939
Patented Sept. 22, 1964

3,149,939
CENTRIFUGAL SEPARATOR
Bendt Wegge Larsen, Nordborg, Denmark, assignor to Danfoss ved. Ing. M. Clausen, Nordborg, Denmark, a company of Denmark
Filed May 4, 1961, Ser. No. 107,733
Claims priority, application Germany, May 4, 1960, D 33,332
4 Claims. (Cl. 55—204)

This invention relates to an air separating device and is more particularly concerned with a device for separating air from oil, especially fuel oil being fed to an oil burner.

In fuel oil feed installations, air is usually entrained in the oil being fed. In order to avoid this, it has been proposed to connect an exhauster in the oil line. Thus, there has been proposed an air discharge device in the form of a chamber in which the air can be discharged under the action of gravity alone. However, the separation action of this device is, in practice, very slight.

It is accordingly an object of the invention to provide an air-separating device which is effective to separate entrained air from oil and which has a high separating activity.

In accordance with the present invention, the air-separating action is greatly improved by the provision of a device which comprises a hollow cylindrical body provided with an inlet through which the liquid medium, e.g. oil, to be freed from air can be led under pressure and directed substantially tangentially to the inner surface of a cylindrical wall in the hollow body, an outlet for the oil being provided at the lower end of the hollow body.

When, for example, this air-discharge device is connected between the two pumps of a two-stage fuel oil pumping system, the pressure given to the liquid medium by the suction pump suffices to confer upon it a strong rotational movement in the device. The ensuing action of centrifugal forces brings about an almost complete removal of the air from the liquid medium. The air exhaust device of this invention has no moving parts and it can, therefore, be installed or embodied anywhere in the oil feeding system, for example, in the pump housing.

In its simplest form, the cylindrical hollow body has a substantially vertical cylindrical wall, which, from the mechanical standpoint, can be readily and inexpensively formed.

The position of the inlet into the hollow body can be varied somewhat without losing the benefits of the invention. Thus, the inlet may be disposed substantially tangentially to the inner wall in the upper part of the hollow body, or it may be in the form of a channel entering tangentially and obliquely from below in the bottom portion of the hollow body.

The latter construction is particularly suitable in an embodiment of the invention wherein a cylindrical partition is concentrically provided in the hollow body between the inlet and the outlet, the partition having a height which is less than the height of the hollow body, the rotational movement of the oil then taking place along the inner surface of the wall of the partition. The space between the partition wall and the hollow body wall serves for the discharge of the air-freed liquid medium.

In an embodiment in which the upper part of the hollow body is closed by means of a transparent cover, the air discharge device may likewise be used for controlling the pumping operation.

The means for discharging the air is also subject to variation and in order to prevent any loss in pressure, a throttling or restricting pasage is advantageously used in connection with the air discharge. When the transparent cover is fixed with an axial screw, intersecting transverse and longitudinal bores may be provided in the screw to form passageways for the discharge of air. An especially preferred construction includes a spiral spring which is concentrically disposed along the axis of the hollow body and which has a direction of winding which is opposite to the direction of rotation of the liquid medium to be freed from air. In this case, the air outlet is advantageously provided at the lower end of the spring and consequently at the lower end of the hollow body.

Other characteristics of the invention will be readily apparent from the following detailed description of several illustrative embodiments taken in connection with the drawings, wherein, FIG. 1 is a longitudinal sectional view of an air-separating device embodying features of the present invention;

FIG. 2 is a transverse cross-sectional view of the device shown in FIG. 1;

FIG. 3 is a cross-sectional view of another embodiment of the air separating device of the invention, showing the device associated with an oil-feeding system which is illustrated diagrammatically;

FIG. 4 is a transverse cross-sectional view of the device shown in FIG. 3;

FIG. 5 is a longitudinal sectional view of a further embodiment of the invention; and FIG. 6 is a similar view of another embodiment, showing it associated with a one-stage feed system.

In the embodiment shown in FIGS. 1 and 2, the cylindrical space 1 is formed as a hollow body in the surrounding casing. In the lower part of the space 1 is the oil outlet channel 2, and at the upper end is provided the inlet channel 3. The inlet channel 3 enters the wall of the cylindrical space substantially tangentially so that the oil entering under pressure rotates in the direction of the arrow (FIG. 2) on the wall of the cylindrical space and follows a generally downwardly moving spiral path. The upper portion of the cylindrical space is closed by a cover 4 in which there is a throttling or restricted opening 5 through which the separated air is led into the collection space 6 above the cover and then through the outlet line 7.

As seen in FIGS. 3 and 4, an air exhaust device in accordance with the invention is disposed between the suction pump 9 and the pressure pump 10 of a two-stage feed system for the nozzle 11. A flow adjustment device is shown at 12 and an oil storage container is shown at 13. These elements are of conventional construction and form no part of the present invention. In the system of FIGS. 3 and 4, the oil issues from the pipe 14 tangentially and obliquely from below into the body of the cylindrical space 15 and is set into rotational motion on the inner side of the cylindrical partition wall 16. The air-freed oil then flows over the top edge of the partition wall and flows down between the partition wall 16 and the outer wall of the cylindrical space 15 and then into the outlet pipe 17, as seen in FIG. 3.

The cylindrical space is closed at its top by means of a transparent cover 18 which is secured by means of the screw 19. Through the transparent cover 18 it is possible to observe the operation of the device as well as the operation of the pumps.

A spiral spring 20 surrounds the screw 19. The spring has a direction of winding which is opposite to the direction of rotational movement of the oil on the partition wall 15. As a result, the air set into motion by the oil and freed from it is downwardly-deflected by the helical windings of the spring and may then enter an annular space 21 and pass into the pipe 22. This air is then vented from the system through the conventional vent (not shown) provided in connection with the storage container 13. The velocity of the oil coming from the pump 9 and introduced into the chamber defined by the partition wall 16 causes the oil to ascend the wall of the partition and to flow into the annular chamber between the partition and the body of the device and this oil is removed from this annular chamber through the outlet pipe 17. Only the separated air, therefore, flows out through pipe 22.

FIG. 5 shows a somewhat modified form of the air-separating device. In this embodiment which is similar to that of FIGS. 3 and 4, the screw 19 holding down the cover 18 is provided with an oblique bore 23, which serves as a throttling bore, and with a longitudinal bore 24 so that the air from the upper part of the hollow body will be conducted to a collection space 25 and from there to the outlet pipe 26.

The embodiment shown in FIG. 6 is like that of FIGS. 3 and 4 except that the threads of the screw 19 are utilized to form a restricted or throttling passage in the section 27 so that the air pressed downward from the helical spring can be led off through the annular chamber 21, the threads in section 27, the collection space 28 and the pipe 29. In section 27 it will be understood that the threaded engagement between the screw and the surrounding wall is relatively loose. In FIG. 6, this exhaust device is connected to a one-stage pumping system in which the pump 30 advances the oil from the storage container 31 through the pressure pipe 32, the air separating device, the pressure pipe 33, the flow regulator 34, to the nozzle 35. The other embodiments of the air separating device are likewise suitable for single-stage as well as multi-stage pumping systems.

It will be understood that various changes and modifications may be made in the embodiments of the invention described above and shown in the drawings without departing from the invention as defined in the appended claims and it is intended, therefore, that all matter contained in the foregoing description and in the drawings shall be interpreted as illustrative only and not as limitative of the invention.

What I claim and desire to secure by Letters Patent is:

1. An air-separating device for separating air from oil and like liquid media which comprises, in combination, a body having therein a vertical bore extending partially through said body defining a substantial cylindrical cavity having a bottom, a substantially vertical cylindrical wall and an open top, a cover for said open top, a central screw extending through said cover and threaded into said body at the bottom of said cavity to secure said cover removably in position to close the top of said cavity, a cylindrical partition disposed in said cavity concentrically therewith and close to but spaced radially inwardly from the cylindrical wall of said cavity to define an outer annular chamber and an inner annular chamber within said cavity, said partition extending up from said bottom and having a height which is less than the height of said cavity whereby said inner and outer chambers are interconnected only at the top of said partition, a tangential inlet passage formed in said body and opening through said bottom to direct the liquid medium to be freed from air substantially tangentially toward the inner surface of said partition, to produce a rotational movement of liquid introduced into said inner chamber through said inlet, a liquid outlet passage for the liquid medium freed from air formed in said body and opening into the lower portion of said outer chamber, an air outlet passage formed in said body and opening into the bottom of the central portion of said inner chamber and means associated with said screw for leading the separated air from the upper portion of said inner chamber to said air outlet for removal of air from said inner chamber.

2. An air-separating device according to claim 1, in which said last-mentioned means comprises a vertical passageway formed in said screw.

3. An air-separating device according to claim 1, in which said last-mentioned means comprises a helical spring surrounding said screw and wound in a direction opposite to the rotational direction of liquid introduced through said inlet.

4. An air-separating device according to claim 1, in which said cover is transparent for viewing into said cavity.

References Cited in the file of this patent
UNITED STATES PATENTS

| | | |
|---|---|---|
| 967,696 | Wiedemann et al. | Aug. 16, 1910 |
| 2,093,082 | Karlstrom | Sept. 14, 1937 |
| 2,187,646 | Darrieus | Jan. 16, 1940 |
| 2,228,401 | Pressler | Jan. 14, 1941 |
| 2,687,782 | Sonderegger | Aug. 31, 1954 |
| 2,765,867 | Revallier et al. | Oct. 9, 1956 |
| 2,925,878 | Spann | Feb. 23, 1960 |
| 2,952,330 | Winslow | Sept. 13, 1960 |
| 2,983,331 | Helsley | May 9, 1961 |